United States Patent [19]

Razzano

[11] 4,272,624
[45] * Jun. 9, 1981

[54] PROCESS FOR PRODUCING HIGH MOLECULAR WEIGHT DIORGANOPOLYSILOXANES FOR USE IN HEAT VULCANIZABLE SILICONE RUBBER COMPOSITIONS

[75] Inventor: John S. Razzano, Troy, N.Y.

[73] Assignee: General Electric Company, Waterford, N.Y.

[*] Notice: The portion of the term of this patent subsequent to Feb. 10, 1993, has been disclaimed.

[21] Appl. No.: 585,675

[22] Filed: Jun. 10, 1975

Related U.S. Application Data

[63] Continuation of Ser. No. 463,435, Apr. 24, 1974, Pat. No. 3,937,684.

[51] Int. Cl.$^3$ .............................................. C08G 77/04
[52] U.S. Cl. ........................................ 528/37; 528/14; 528/21; 528/23; 556/450; 556/459; 260/37 SB
[58] Field of Search .................... 260/448.2 E, 46.5 R, 260/46.5 G, 46.5 E; 528/37, 23, 21, 14; 556/459, 450

[56] References Cited

U.S. PATENT DOCUMENTS

| 3,132,167 | 5/1964 | Boot et al. ...................... 260/46.5 R |
| 3,433,765 | 3/1969 | Geipel .................................... 528/37 |
| 3,481,898 | 12/1969 | Davies et al. ............................ 528/37 |
| 3,661,962 | 5/1972 | Geipel ............................ 260/46.5 R |
| 3,779,987 | 12/1973 | Razzano ................................. 528/37 |
| 3,937,684 | 2/1976 | Razzano ......................... 260/46.5 G |
| 3,978,104 | 8/1976 | Razzano ................................. 528/37 |

Primary Examiner—Melvyn I. Marquis
Attorney, Agent, or Firm—E. Philip Koltos; John L. Young; Philip L. Schlamp

[57] ABSTRACT

A process for producing diorganopolysiloxane gums having a viscosity from 1,000 to 100,000,000 centipoise at 25° C., where at least one of the organo substituent groups on the silicon atoms is an aliphatic radical of more than three carbon atoms comprising reacting a cyclic tetrasiloxane or a mixture of cyclic tetrasiloxanes at a temperature in the range of 0° to 90° C. and in the presence of 5 to 300 parts per million of a catalyst selected from the class consisting of cesium hydroxide and

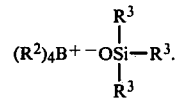

where $R^2$ is selected from the class consisting of alkyl radicals of 1 to 8 carbon atoms, cycloalkyl radicals of 4 to 8 carbon atoms and phenyl, B is selected from the class consisting of nitrogen and phosphorous, $R^3$ is selected from the class consisting of alkyl radicals of 1 to 8 carbon atoms, cycloalkyl radicals of 4 to 8 carbon atoms, phenyl, siloxane chains of the unit formula $R_a^4 SiO_{(4-a/2)}$ and mixtures thereof, where $R^4$ is selected from the class consisting of monovalent hydrocarbon radicals and halogenated monovalent hydrocarbon radicals, and a varies from 1.5 to 2.5.

5 Claims, No Drawings

PROCESS FOR PRODUCING HIGH MOLECULAR WEIGHT DIORGANOPOLYSILOXANES FOR USE IN HEAT VULCANIZABLE SILICONE RUBBER COMPOSITIONS

This application is a continuation of parent application Ser. No. 463,435 filed Apr. 24, 1974 which is now U.S. Pat. No. 3,937,684.

BACKGROUND OF THE INVENTION

The present invention relates to a process for producing diorganopolysiloxane gums of low and high molecular weight from cyclic siloxanes and more specifically the present invention relates to a process for producing high molecular weight diorganopolysiloxane gums from cyclic tetrasiloxanes, where at least one of the organo groups appended to the silicon atoms in the diorganopolysiloxane has three carbon atoms or more.

In the process for producing low and high molecular diorganopolysiloxane gums having a viscosity that varies from 1,000 to 200,000,000 centipoise viscosity at 25° C., wherein the high molecular weight gums are the basic ingredient for producing heat vulcanizable silicone rubber compositions, it is often desirable to utilize cyclicsiloxanes. In such a process for producing diorganopolysiloxane gums and oils, the usual procedure is to take diorganochlorosilanes of high purity, hydrolyze such diorganodichlorosilanes in water at about room temperature, take the hydrolyzate and separate the water from it, and then add to the hydrolyzate a catalyst such as, potassium hydroxide or sodium hydroxide. The resulting mixture is heated at elevated temperatures of above 100° C. for a period of time of anywhere from 1 hour to 8 hours so as to distill overhead and obtain from the hydrolyzate a large proportion of cyclic trisiloxanes, cyclic tetrasiloxanes, cyclic pentasiloxanes and etc. In this cracking procedure of the hydrolyzate which results in the production of a large amount of cyclic siloxanes from the hydrolyzate, it is desirable to produce and separate from the cyclic siloxanes that are formed the cyclic tetrasiloxane. It has been found with methyl substituent groups that such tetrasiloxanes may then be taken in substantially pure form and equilibrated in the presence of a catalyst such as, potassium hydroxide. In such an equilibration mixture, there is also present chain-stoppers, that is, disiloxanes and/or low molecular weight diorganopolysiloxanes containing triorganosiloxy terminal groups, wherein the triorganosiloxy terminal groups function as the chain-stopper. Such tetrasiloxanes are equilibrated with such chain-stopper in the presence of small amounts of potassium hydroxide at elevated temperatures above 150° C. to result in equilibration mixture wherein about 85% of the cyclic tetrapolysiloxanes are converted into the desired low or high molecular weight diorganopolysiloxane gum or oil of anywhere from 1,000 to 200,000,000 centipoise viscosity at 25° C.

At this equilibration point, as much of the tetrasiloxanes are being formed into the diorganopolysiloxane oil or gum as there is of the already formed diorganopolysiloxane oil or gum breaking down and reforming cyclic tetrasiloxanes. It has been found in this equilibration procedure that at most only 85% of the original cyclic tetrasiloxanes can be converted to the desired diorganopolysiloxane gum or oil, with the other 15% by weight of the cyclic tetrasiloxanes being present in equilibration with diorganopolysiloxane gum or oil.

At this point, the catalyst is neutralized and the volatiles are removed to result in the desired diorganopolysiloxane oil or gum. With this procedure it has been found it is possible to obtain a diorganopolysiloxane oil or gum of anywhere from 1,000 to 200,000,000 centipoise viscosity at 25° C., but only where the organo substituent groups are methyl, vinyl or phenyl. When it has been attempted to form diorganopolysiloxane oils or gums where at least one of the organo groups appended to the silicon atom is an aliphatic radical or halogenated aliphatic radical of three carbon atoms or more, it was found that tetra cyclicsiloxanes and higher cyclic siloxanes such as, pentacyclic siloxanes would not work in such an equilibration procedure as that described above. It was found that with such cyclic tetrasiloxanes containing at least one organo substituent group on the silicon atom which was an aliphatic or haloaliphatic radical of three carbon atoms or more that at the equilibration point there would be a very low yield of diorganopolysiloxane oil or gum, that is only 10 to 20% of the cyclic tetrasiloxane or higher cyclic siloxane would be converted to the diorganopolysiloxane gum or oil, versus the 85% by weight which is experienced with octamethyltetrasiloxanes. Thus, it is necessary to find a procedure wherein low molecular weight or high molecular weight diorganopolysiloxane gums or oils could be formed where one of the organo groups appended to the silicon atoms was an aliphatic or haloaliphatic radical of three carbon atoms or more and wherein such diorganopolysiloxane gums or oils can be formed in high yield from cyclic tetrasiloxanes.

In this respect, note the disclosure of Pierce et al, U.S. Pat. No. 2,979,519, Column 2, beginning with line 6, where it is stated that it has been found that commercially successful rubbers, that is, heat vulcanizable silicone rubbers, cannot be prepared by known methods from the crude hydrolysis product of chlorosilanes of the formula,

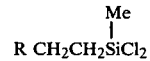

or from the cyclic siloxanes of the formula,

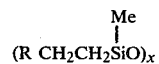

where x is 4 or more. It should also be noted that this statement is supported by affidavit evidence in the file history of this patent. It is stated in the file history of that patent that diorganopolysiloxane gums of high molecular weight cannot be formed from cyclic tetrasiloxanes where one of the substituent groups in the cyclic polysiloxane contains 3 carbon atoms or more and specifically contains a CH$_2$CH$_2$R group, where R is a perfluoroalkyl radical.

It was the contention of Pierce et al in U.S. Pat. No. 2,979,519 and its file history, that high molecular weight diorganopolysiloxane gums that allegedly would not be formed from such tetrasiloxanes could be formed from cyclic trisiloxanes.

With respect to the formation of low molecular weight polysiloxane oils having a low viscosity and having the R, R' substituent groups, it has been found that such oils could be formed from cyclic tetrasiloxanes only in low yield such as 10% to 15%.

In addition, the reaction equilibration mixture was such that most of it was still composed of cyclics rather than low viscosity desired polymers when the equilibration reaction was terminated.

It should also be understood that the process of Pierce et al in U.S. Pat. No. 2,979,519 could not be used to form such low molecular weight polysiloxanes from cyclic trisiloxanes since such cyclic trisiloxanes immediately react to form high molecular weight polymers so that even with a large amount of chain-stoppers in the reaction mixture, the reaction cannot be controlled to form low molecular weight polymers.

Accordingly, it is highly desirable to develop a process for the production of low molecular weight polysiloxanes of a viscosity varying from 1,000 to 200,000 at 25° C., which polysiloxane is obtained in high yield as 70% or more by the equilibration of cyclic tetrasiloxanes of Formula (1).

One difficulty with the Pierce et al procedure in the use of the cyclic trisiloxanes which is set forth in the foregoing patent is that such cyclic trisiloxanes are formed in low yield during the initial cracking of the hydrolyzate with potassium hydroxide or sodium hydroxide. Accordingly, the amount of cyclic trisiloxane that is formed during the cracking procedure is not as high as the tetra cyclicsiloxane. Accordingly, various procedures are utilized to maximize the yield of cyclic trisiloxanes from the cracking process so as to make the use of such cyclic trisiloxanes to form high molecular weight polysiloxanes as economic as possible. Nevertheless, in spite of such procedures, the process for forming polymers from cyclic trisiloxanes is still more expensive than from the use of cyclic tetrasiloxanes.

It has now been unexpectedly found that at certain low temperature ranges which were not envisioned previously and in the presence of certain select catalysts, cyclic tetrasiloxanes and mixtures of such cyclic tetrasiloxanes can be equilibrated at relatively high yield and where one of the organo substituent groups appended to the silicon atom is an aliphatic or haloaliphatic radical of 3 carbon atoms or more such as, the —$CH_2CH_2R$ radical, where R is a perfluoroalkyl radical. Such cyclic tetrasiloxanes can be equilibrated at relatively high yields to produce low molecular weight oils or high molecular weight diorganopolysiloxane gums suitable for forming heat vulcanizable silicone rubber compositions.

It is, thus, one object of the present invention to provide a process for producing low molecular weight oils or high molecular weight diorganopolysiloxane gums wherein one of the organo groups appended to the silicon atom is an aliphatic or haloaliphatic radical of three carbon atoms or more from cyclic tetrasiloxanes and mixtures of cyclic tetrasiloxanes.

It is an additional object of the present invention to provide for a process for producing low molecular weight oils or high molecular weight diorganopolysiloxane gums in high yield wherein one of the organo groups appended to the silicon atom is an aliphatic or haloaliphatic radical of at least three carbon atoms or more.

It is still another object of the present invention to provide for a process for producing low molecular weight oils or high molecular weight diorganopolysiloxane gums having a viscosity from 1,000 to 200,000,000 centipoise at 25° C., where at least one of the organo groups appended to the silicon atoms is an aliphatic or haloaliphatic radical of 3 carbon atoms or more by equilibrating cyclic tetrasiloxanes and mixtures of cyclic tetrasiloxanes at low temperatures in the presence of certain select catalysts.

It is yet an additional object of the present invention to provide a process for forming diorganopolysiloxane oils or gums having a viscosity from 1,000 to 200,000,000 centipoise at 25° C., where at least one of the organo groups appended to the silicon atoms is a —$CH_2CH_2R^5$ substituent group, where $R^5$ is a perfluoroalkyl radical, by reacting cyclic tetrasiloxanes.

SUMMARY OF THE INVENTION

In accordance with the foregoing objects there is provided by the present invention a process for producing diorganopolysiloxane oils or gums having a viscosity from 1,000 to 200,000,000 centipoise at 25° C., where at least one of the organo groups appended to the silicon atoms is an aliphatic or haloaliphatic radical of 3 carbon atoms or more comprising reacting cyclic polysiloxanes of the formula, $$(RR^1SiO)_4 \tag{1}$$

and mixtures thereof at a temperature in the range of 0° to 90° C. in the presence of 5 to 300 parts per million of a catalyst selected from the class consisting of cesium hydroxide, and

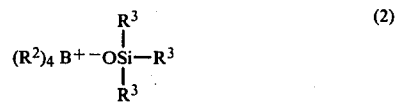

(2)

where $R^2$ is selected from the class consisting of alkyl radicals of 1 to 8 carbon atoms, cycloalkyl radicals of 4 to 8 carbon atoms and phenyl, B is selected from the class consisting of nitrogen and phosphorous, $R^3$ is selected from the class consisting of alkyl radicals of 1 to 8 carbon atoms, cycloalkyl radicals of 4 to 8 carbon atoms, phenyl, siloxane chains of the unit formula $R_a^4SiO_{(4-a)/2}$ and mixtures thereof, where $R^4$ is selected from the class consisting of monovalent hydrocarbon radicals and halogenated monovalent hydrocarbon radicals, a varies from 1.5 to 2.5, and neutralizing the catalyst in the reaction mixture after equilibration has been reached where R is selected from the class consisting of methyl, ethyl, vinyl and phenyl and R' is selected from the class consisting of alkyl radicals, halogenated alkyl radicals and cycloalkyl radicals of 3 to 8 carbon atoms.

In this process, it is preferred that after the equilibrium has been reached that the catalyst be neutralized with an ingredient selected from the class consisting of inorganic acids such as, phosphoric acid and organosilanes of the formula $R_b^6SiX_{4-b}$, where $R^6$ is selected from the class consisting of alkyl radicals, cycloalkyl radicals, vinyl radicals and phenyl radicals, and preferably alkyl radicals, cycloalkyl radicals of 1 to 8 carbon atoms, and X is selected from the class consisting of bromine and chlorine where b varies from 0 to 3.

To obtain the final diorganopolysiloxane oil or gum in essentially pure form it is within the ambient of the present invention and after the equilibration and neutralization steps that the reaction mixture be heated to 150° to 200° C. at a vacuum of 1 to 100 millimeters of mercury to strip off all volatiles so as to result in the desired product. The equilibration reaction with the cyclic tetrasiloxanes to form the diorganopolysiloxane oil or gum, as has been pointed out above, may take anywhere from ½ hour to 10 hours and more preferably from 50 minutes to 10 hours. In order for the process to be of maximum efficiency, it is desired that the cyclic tetrasiloxanes that are reacted in the above equilibration reaction have less than 20 parts per million of trifunctional silanes, less than 200 parts per million of monofunctional siloxanes, 0 to 5% by weight of other cyclic siloxanes, that is, other than the tetrasiloxanes, and less than 10 parts per million of water. Further, preferably, the R' substituent radical in the above formula of the tetrasiloxanes is $R^5CH_2CH_2$, where $R^5$ is a perfluoroalkyl radical of 1 to 6 carbon atoms. With this process there may be obtained a low molecular weight oil or a high molecular weight diorganopolysiloxane gum of anywhere from 1,000 to 200,000,000 centipoise viscosity at 25° C., and more preferably an oil or gum having a viscosity of anywhere from 1,000 to 100,000,000 centipoise viscosity at 25° C.

From this process there can be obtained a high molecular weight diorganopolysiloxane gum having a viscosity of anywhere from 1,000,000 to 100,000,000 centipoise viscosity at 25° C., which gums are advantageously utilized to form heat vulcanizable silicone rubber compositions and elastomers which in the case of the gums having the $—CH_2CH_2R^5$ substituent groups such gums have a high resistance to oil swell and oil degradation.

DESCRIPTION OF THE PREFERRED EMBODIMENT

The R and R' radical in Formula (1) above, the cyclic tetrasiloxanes, are representative of monovalent hydrocarbon radicals and halogenated monovalent hydrocarbon radicals that are typically appended to silicon atoms but with the modification that at least the R' radical contains 3 carbon atoms or more. In the formulation of Formula (1), above, the R radical is specifically selected from the class consisting of methyl, ethyl, vinyl and phenyl while the R' radical is selected from the class consisting of alkyl radicals such as, propyl, butyl and etc. of 3 to 8 carbon atoms; halogenated alkyl radicals such as, 3-chloropropyl, 4-chlorobutyl, 3-fluoropropyl, 3,3-difluoropropyl, 3,3,3-trifluoropropyl of 3 to 8 carbon atoms and cycloalkyl radicals of 4 to 8 carbon atoms such as, cyclopentyl, cyclohexyl, cycloheptyl, etc. Preferably, the R' radical may be a substituent group such as, $—CH_2CH_2R^5$, where the $R^5$ radical is a perfluoroalkyl radical containing from 1 to 6 carbon atoms such as, perfluoromethyl, perfluoroethyl and etc. More preferably, the R' radical is 3,3,3,-trifluoropropyl while R is methyl or ethyl.

In Formula (2), the $R^2$ radical is generally selected from monovalent hydrocarbon radicals, halogenated movovalent hydrocarbon radicals of 1 to 8 carbon atoms and is more preferably selected from alkyl radicals of 1 to 8 carbon atoms such as, methyl, ethyl, propyl, etc.; cycloalkyl radicals of 4 to 8 carbon atoms such as, cyclohexyl, cycloheptyl and etc. and phenyl radicals.

The $R^3$ radical in Formula (2) above, may again be any monovalent hydrocarbon radical and halogenated monovalent hydrocarbon radical generally associated with substituent groups to silicon atoms and is preferably selected from alkyl radicals of 1 to 8 carbon atoms such as, methyl, ethyl, propyl, butyl and etc.; cycloalkyl radicals of 4 to 8 carbon atoms such as, cyclopentyl, cyclohexyl, cycloheptyl and aryl radicals such as, phenyl. The $R^3$ radical may also be selected from polysiloxane polymers which are linear, such polymeric silicone material having the unit formula $R_a{}^4SiO_{(4-a)/2}$, where $R^4$ is selected from the class consisting of monovalent hydrocarbon radicals and halogenated monovalent hydrocarbon radicals and is preferably an alkyl radical of 1 to 8 carbon atoms; a cycloalkyl radical of 4 to 8 carbon atoms, a vinyl radical or a phenyl radical and a in the unit formula varies from 1.5 to 2.5. Preferably, in such polymeric chains, that is, when the $R^3$ radical represents a polymeric chain, such a chain is linear and the $R^4$ radical is a methyl, phenyl, vinyl or 3,3,3-trifluoropropyl and a in the unit formula varies from 1.98 to 2.01.

In Formula (2), preferably, two of the $R^3$ radicals are alkyl radicals of 1 to 8 carbon atoms, phenyl radicals, vinyl radicals and the other $R^3$ radical is a polysiloxane chain of the unit formula indicated above, where $R^4$ again is methyl, vinyl, phenyl or 3,3,3-trifluoropropyl, or a mixture of such radicals and a in the unit formula varies from 1.98 to 2.01.

The process of the present case is initiated with the production of cyclic tetrasiloxanes of Formula (1), above. Such cyclic tetrasiloxanes are obtained by first taking diorganodihalogensilanes as of the formula $R'RSiX_2$, where R and R' is as previously defined before in accordance with Formula (1), and X is selected from halogen such as, chlorine or bromine and is preferably chlorine. Such diorganodihalogendihalogensilanes and preferably diorganodichlorosilanes at a purity of about 99% by weight are added to water at room temperature. Preferably, there is 2 to 10 moles of water per mole of the diorganodihalogensilane. In the most preferred case, it is desired that the water hydrolysis mixture after the diorganodihalosilanes have been added to the water that the water hydrolysis mixture contain 20% by weight of HCl. Although this hydrolysis need not be carried out in the presence of a solvent, it may be carried out in the presence of a water-immiscible solvent such as, for example, toluene, xylene, benzene and etc. The use of a solvent facilitates the separation of the hydrolyzate from the aqueous acid solution. Accordingly, prior to the addition of the organohalosilanes to the water a solvent may be added to the water or the solvent may be added after the organohalosilanes and mixtures of organohalosilanes are added to the water. Preferably, the water-immiscible organic solvent is added to the water prior to the addition of the diorganodihalosilanes.

It is preferred that the diorganodihalosilanes be as of high purity as possible and preferably 99% by weight purity so as to prevent undesirable impurities such as, trifunctional siloxane impurities in the hydrolyzate. The organohalosilanes are added to the water and water-immiscible solvent over a period of ½ hour to 2 hours with agitation. The hydrolyzate which becomes dissolved in the water-immiscible solvent phase is then separated from the water phase. This hydrolyzate in the water-immiscible organic solvent is then neutralized with a mild base such as, sodium bicarbonate to a pH of about 7 to 8 so as to neutralize any residual amounts of acid, specifically the hydrochloric acid that might become entrapped with the hydrolyzate in the water-immiscible organic solvent phase. This hydrolyzate which is dissolved in the water-immiscible organic solvent phase contains mostly cyclic polysiloxanes of anywhere from 3 silicon atoms to 10 silicon atoms and low molecular weight linear silanol end-stopped diorganopolysiloxanes. The hydrolyzate is then taken and heated at elevated temperatures depending on what the water-immiscible organic solvent is so as to remove all the solvent by overhead distillation from the siloxane hydrolyzate. The hydrolyzate from which most of the solvent has been removed may then be taken and utilized in a cracking procedure by adding to such siloxane hydrolyzate from 0.1 to 5% by weight and preferably from 0.1 to 2% by weight of a cracking catalyst selected from the class consisting of potassium hydroxide, sodium hydroxide and cesium hydroxide. Preferably, the amount of catalyst that is utilized is from 0.5 to 2% by weight.

The resulting hydrolyzate with the cracking catalyst in it, is then heated at elevated temperatures of above 150° C. at anywhere from 150° to 200° C. and preferably under a vaccuum of 1 to 100 millimeters of mercury and more preferably under a vacuum of 5 to 40 millimeters of mercury for a period of time of anywhere from 1 hour to 5 hours. During such heating of the hydrolyzate with the cracking catalyst there is continually distilled overhead a mixture of cyclic polysiloxanes and specifically cyclic tripolysiloxanes, cyclic tetrapolysiloxanes and cyclic pentapolysiloxanes. This cracking procedure with the cracking catalyst, that is, potassium hydroxide, sodium hydroxide or cesium hydroxide, is utilized to maximize the formation of these three types of cyclics from the hydrolyzate. By such a cracking procedure, 95% by weight of the hydrolyzate can be converted to cyclic trisiloxanes, cyclic tetrasiloxanes and cyclic pentasiloxanes which maximizes the formation of the cyclic tetrapolysiloxanes from the initial hydrolyzate which cyclic tetrapolysiloxanes are utilized in the basic process of the present case. In this cracking procedure, a solvent may be utilized. However, it is a requirement that such a cracker process oil must be a very high boiling solvent so that the solvent will not be distilled overhead along with the cyclic trisiloxanes, the cyclic tetrasiloxanes and the cyclic pentasiloxanes.

At this point, the cyclic tetrasiloxanes may be separated by known distillation procedures from the cyclic trisiloxanes and the cyclic pentasiloxanes by distilling this mixture of cyclic polysiloxanes at temperatures anywhere in the neighborhood of 80° to 200° C. and under pressure of anywhere from 1 to 100 millimeters of mercury pressure and more preferably at a pressure of anywhere from 1 to 20 millimeters of mercury. By such a distillation procedure, there is obtained an essentially pure cyclic tetrasiloxane of Formula (1) above, wherein the cyclic trisiloxanes and the cyclic pentasiloxanes are recycled back into the cracking vessel and mixed with additional hydrolyzate to again produce by the cracking procedure described previously a mixture of cyclic trisiloxanes, cyclic tetrasiloxanes and cyclic pentasiloxanes in 95% yield. By such distillation purification procedure, that is, separating the cyclic tetrasiloxanes from the cyclic trisiloxanes and the cyclic pentasiloxanes, there is obtained an essentially pure cyclic tetrasiloxane of Formula (1), above, in 70 to 80% yield from the siloxane hydrolyzate, which cyclic tetrasiloxane contains less than 200 parts per million of monofunctional siloxy units, less than 20 parts per million of trifunctional siloxy units and anywhere from 0 to 5% by weight of other cyclic siloxanes, that is, cyclic trisiloxanes or cyclic pentasiloxanes. If there is more than the above indicated amount of monofunctional siloxy units or trifunctional siloxy units, then the cyclic tetrasiloxane may gel during the subsequent equilibration in which the high molecular weight diorganopolysiloxane gum is formed.

It is also preferred that there be present less than 10 parts per million of water in the cyclic tetrasiloxanes or mixtures of cyclic tetrasiloxanes of Formula (1), above, which is to be utilized in equilibration reaction. To accomplish this, the essentially pure cyclic tetrasiloxanes of Formula (1) above, are heated to 100° C. or above with a nitrogen purge which effectively reduces the water content of the cyclic tetrasiloxanes to less than 10 parts per million. If there is substantially more than this amount of water present in the cyclic tetrasiloxanes, then the desired low molecular weight oil or high molecular weight diorganopolysiloxane gum will not be formed.

Accordingly, the cyclic tetra polysiloxanes of Formula (1), above, as identified, are placed in a vessel. There may not be utilized a solvent along with the cyclic tetra polysiloxane of Formula (1) above.

In the utilization of such cyclic tetrasiloxanes of Formula (1) above, in the process of the present case there are two critical aspects, the temperature of reaction and the catalyst that is utilized. Accordingly, there is preferably present 5 to 300 parts per million and more preferably 10 to 100 parts per million of the catalyst of Formula (2) above. It has been found that only these two types of catalysts will function in the process of the present case. Preferably, the reaction is carried out at a temperature of anywhere from 0° to 90° C. and more preferably at a temperature of 15° to 40° C. If a temperature below 0° is used or a temperature above 90° C. is utilized then there is not the maximum formation of the desired high molecular weight diorganopolysiloxane gum from the cyclic tetrasiloxanes of Formula (1) above. In addition, the polymerization rate is too slow. The highest yield of the desired high molecular weight diorganopolysiloxane gum is obtained when the temperature of reaction of equilibration is between 5° C. to 40° C. with all the catalysts with the exception of the cesium hydroxide which cesium hydroxide is desirably used at a reaction temperature of 70° C. to 90° C. Cesium hydroxide is, of course, a well known material. As for the catalyst of Formula (2) above, such materials are well known in silicone chemistry and are obtained by reacting, for instance, a tetra organo ammonium hydroxide with any diorganopolysiloxane fluid or even a cyclic polysiloxane such as, octamethyltetrasiloxane. In the case of Formula (2), above, when B is equal to phosphorous the catalyst of the process of the present case is obtained by reacting a tetra organo phosphonium hydroxide compound which is well known in the art again with any linear polysiloxane fluid which is well known in the art or with any cyclic polysiloxane such as, octamethyltetracyclicpolysiloxane.

The cyclic tetrasiloxane of Formula (1) above, along with the catalyst are heated or cooled at the indicated temperature range for a period of time of anywhere from $\frac{1}{2}$ hour to 10 hours, preferably from 50 minutes to 10 hours, during which point equilibration is reached wherein there will be 70 to 80% by weight of the cyclic tetrasiloxanes of Formula (1) converted to the desired low molecular weight oil or high molecular weight diorganopolysiloxane gum. In this case, there will be 20 to 30% of the cyclic polysiloxanes of Formula (1) remaining in the second state, that is, at the equilibration point as much of the cyclic polysiloxanes are being formed into the diorganopolysiloxane oil or gum as there is of the diorganopolysiloxane gum or oil breaking up to form cyclic polysiloxanes of Formula (1). Accordingly, when this equilibration point has been reached, then the reaction mixture is cooled and there is added to it an agent to neutralize the catalyst. Many neutralizing agents may be utilized to neutralize the catalyst but there is preferably utilized in the present invention either phosphoric acid, an organohalosilane or halosilane of the formula, $R_b{}^6SiX_{4-b}$, where $R^6$ is selected from the class consisting of alkyl radicals, cycloalkyl radicals, vinyl radicals and phenyl radicals where the alkyl and cycloalkyl radicals have anywhere from 1 to 8 carbon atoms and X is selected from the class consisting of bromine and chlorine while b in the formula varies from 0 to 3.

After the neutralization procedure, the reaction mixture is then heated at elevated temperatures at anywhere from 150° to 200° C. with a vacuum of 1 to 100 millimeters of mercury to strip off all cyclic polysiloxanes which may be recycled into the equilibration vessel. There results from this process a low molecular weight oil or high molecular weight a diorganopolysiloxane gum where the substituent groups on the oil or gum are R and R' and which oil or gum has a viscosity of anywhere from 1,000 to 200,000,000 centipoise at 25° C., and preferably has a viscosity of anywhere from 1,000 to 100,000,000 centipoise at 25° C.

It should also be noted that in controlling the viscosity of the end product there is desirably added in the equilibration vessel along with the cyclic tetrasiloxanes of Formula (1) above, and the catalyst, a certain amount of chain stopper. Such chain stoppers being disiloxanes and low molecular weight diorganopolysiloxanes having triorganosiloxy terminal units, that is, having monofunctional terminal units where the organo groups in such chain stoppers are selected from the class consisting of alkyl radicals of 1 to 8 carbon atoms, vinyl radicals, phenyl radicals and cycloalkyl radicals of 4 to 8 carbon atoms and also haloalkyl radicals of anywhere from 1 to 8 carbon atoms such as, trifluoropropyl. The amount of chain stoppers that is utilized in the equilibration vessel is such that it is necessitated by the desired final molecular weight or viscosity of the diorganopolysiloxane oil or gum that is to be formed.

With this process there is obtained a linear diorganopolysiloxane oil or gum in which each silicon atom has an R and R' substituent group, R and R' are as defined in connection with the cyclic tetrasiloxanes of Formula (1) above, which oil or gum has a viscosity of anywhere from 1,000 to 200,000,000 centipoise at 25° C. and preferably has a viscosity of 1,000 to 100,000,000 centipoise at 25° C. Into such oils or gums there may be mixed reinforcing fillers such as, fumed silica or precipitated silica; extending fillers such as, zinc oxide, iron oxide, titanium oxide, diatomaceous earth and etc.; heat aging additives such as, iron oxide; pigments as well as various additives such as, flame retardant additives, for instance, platinum by itself or in combination with other materials and self-bonding additives such as, for instance, triallylisocyanurate. The ingredients are mixed together into a uniform mass which may then be taken and there may be added to it a curing agent which is advantageously a peroxide curing agent such as, benzoyl peroxide or dicumyl peroxide and the resulting composition cured at elevated temperatures of anywhere from 100° to 300° C. or cured by radiation to produce a silicone elastomer. An example of such heat vulcanizable silicone rubber compositions, for instance, is to be found in U.S. Pat. No. 3,730,932, whose disclosure is hereby incorporated into the present application by reference.

The process of the present case provides for a simple and straight-forward procedure for producing low molecular weight oils or high molecular weight diorganopolysiloxane gums from cyclic tetrasiloxanes wherein one of the substituent groups appended to the silicon atom in such gums is a high molecular weight substituent group, that is, an aliphatic or haloaliphatic radical of 3 carbon atoms or more. Such gums may be advantageously used to produce silicone elastomers of outstanding properties such as, for instance, increased resistance to degradation by oil as compared to silicone elastomers formed from diorganopolysiloxane gums where the organo groups are mostly composed of low molecular weight and aromatic substituent groups such as, methyl or vinyl.

The examples below are given for the purpose of illustrating the present invention and are not set forth in any way or manner to limit the definition of the invention as set forth above.

EXAMPLE 1

There was placed 30 parts of 1,3,5,7-tetramethyltetrakis-1,3,5,7-(3,3,3 trifluoropropyl)cyclotetrasiloxane in a resin flask equipped with a mechanical stirrer. The flask were purged with dry nitrogen for 30 minutes to dry the cyclic polysiloxane such that it contained less than 10 parts per million of water. With the flask maintained at room temperature, a 0.05 ml aliquot of a catalyst solution of tetramethyl ammonium silanolate in tetrahydrofuran (at base strength equivalent to 0.5% KOH) was added to the fluorosilicone cyclic tetramer. A viscosity increase was noted thirty minutes after catalyst addition and the viscosity continued to increase. The reaction was allowed to continue for 12 hours and the final polymer was of high viscosity. At that time one drop of dimethyldichlorosilane was added to neutralize and deactivate the catalyst. The batch was now heated to 150° C. and vacuum was applied to 1 mm Hg. Volatiles were distilled from the batch and were collected in a trap cooled in dry ice/acetone. The trap contents and the weight of the remaining polymer showed that 6.6 parts (or 22%) of the polymer had been distilled. Analysis of the polymer indicated a residual volatile content of 3% for a total volatiles in the polymer of 25%. The final polymer had a viscosity of 50,000,000 centipoise at 25° C. and was a methyl,3,3,3-trifluoropropylpolysiloxane.

EXAMPLE 2

There was placed 30 parts of 1,3,5,7-tetramethyl-1,3,5,7-tetrakis(3,3,3-trifluoropropyl)cyclotetrasiloxane in a 100 cc resin flask equipped with a mechanical stirrer and nitrogen drying stream. There was added to the flask 0.4 ml of a chain-stopper consisting of a dimethylvinyl terminated methyl-3,3,3-trifluoropropyl polysiloxane averaging 5 siloxane units. The batch was brought to 70° C. and maintained there as dry nitrogen was swept through the flask to dry the batch for 20 minutes. Then 0.3 ml of a solution of cesium hydroxide in methanol was added to the batch and the nitrogen purge rate was accelerated to drive off the solvent methanol. A viscosity increase was noted after 45 minutes and the batch was maintained at 70° C. for 12 hours. One drop of dimethyldichlorosilane was added to the batch to neutralize and deactivate the cesium hydroxide. The batch was raised to 125° C. and vacuum was applied to remove volatiles. The volatiles collected plus analyses of the resulting oil indicated that the volatiles content of the batch was 30%. The 70% yield of polymeric product had a viscosity of 6000 centipoise at 25° C. and was a dimethylvinyl terminated methyl-3,3,3-trifluoropropyl polysiloxane.

I claim:

1. A process for producing diorganopolysiloxane polymers having a viscosity from 1,000 to 200,000,000 centipoise at 25° C. where at least one of the organo groups is an aliphatic or haloaliphatic radical of at least 3 carbon atoms or more consisting essentially of (a) reacting cyclic polysiloxanes of the formula

(RR'SiO)$_4$ at a temperature in the range of 0° to 90° C. in the presence of 5 to 300 parts per million of a catalyst selected from the class consisting of CsOH, and

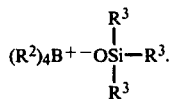

$$(R^2)_4B^+ \ {}^-OSi-R^3.$$

where $R^2$ is selected from the class consisting of alkyl radicals of 1 to 8 carbon atoms, cycloalkyl radicals of 4 to 8 carbon atoms and phenyl, B is selected from the class consisting of nitrogen and phosphorous, $R^3$ is selected from the class consisting of alkyl radicals of 1 to 8 carbon atoms, cycloalkyl radicals of 4 to 8 carbon atoms, phenyl, siloxane chains of the unit formula $R_a{}^4SiO_{(4-a)/2}$ and mixtures thereof where $R^4$ is selected from the class consisting of monovalent hydrocarbon radicals and halogenated monovalent hydrocarbon radicals, a varies from 1.5 to 2.5 until equilibration is reached, and (b) neutralizing the catalyst in the reaction mixture after equilibrium has been reached where R is selected from the class consisting of methyl, ethyl, vinyl and phenyl, R' is $R^5CH_2CH_2-$ and $R^5$ is a perfluoroalkyl radical of 1 to 6 carbon atoms.

2. The process of claim 1 wherein the catalyst is neutralized with an ingredient selected from the class consisting of phosphoric acid and of the formula, $R_b{}^6SiX_{4-b}$, where $R^6$ is selected from the class consisting of alkyl radicals, cycloalkyl radicals, vinyl radicals and phenyl radicals, X is selected from the class consisting of bromine and chlorine, and b varies from 0 to 3.

3. The process of claim 1 wherein after step (b) further comprising heating the reaction mixture to 150° to 200° C. at a vacuum of 1 to 100 mm of Hg to strip off all volatiles so as to result in the desired product.

4. The process of claim 1 wherein the cyclic polysiloxanes are reacted with the catalyst for a period of time varying from ½ hour to 10 hours.

5. The process of claim 1 wherein the cyclic polysiloxanes and mixtures thereof contains less than 20 parts per million of trifunctional siloxanes, less than 200 parts per million of monofunctional siloxanes, and 0 to 5% by weight of other cyclic polysiloxanes and less than 10 parts per million of water.

* * * * *